United States Patent
Wilczek et al.

(10) Patent No.: US 10,007,654 B2
(45) Date of Patent: *Jun. 26, 2018

(54) FEEDBACK VALIDATION OF ELECTRONICALLY GENERATED FORMS

(71) Applicant: Coupa Software Incorporated, San Mateo, CA (US)

(72) Inventors: Donna Wilczek, San Mateo, CA (US); Gabriel Perez, San Mateo, CA (US); Robert Bernshteyn, San Mateo, CA (US); Raja Hammoud, San Mateo, CA (US); David Williams, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/068,239

(22) Filed: Mar. 11, 2016

(65) Prior Publication Data

US 2016/0196254 A1 Jul. 7, 2016

Related U.S. Application Data

(63) Continuation of application No. 14/502,894, filed on Sep. 30, 2014, now Pat. No. 9,286,283.

(51) Int. Cl.
*G06F 17/22* (2006.01)
*G06F 17/24* (2006.01)
*G06K 9/00* (2006.01)

(52) U.S. Cl.
CPC .......... *G06F 17/243* (2013.01); *G06F 17/248* (2013.01); *G06K 9/00449* (2013.01)

(58) Field of Classification Search
CPC ...... G06F 17/24; G06F 21/64; G06F 21/6209; G06F 17/243; G06F 17/30616; G06F 17/30253; G06F 17/248; G06K 9/00449
See application file for complete search history.

(56) References Cited

U.S. PATENT DOCUMENTS

| | | | | |
|---|---|---|---|---|
| 6,385,595 B1 * | 5/2002 | Kolling | ............. | G06Q 20/00 705/34 |
| 7,809,615 B2 * | 10/2010 | Hui | ............. | G06Q 10/067 705/34 |

(Continued)

OTHER PUBLICATIONS

U.S. Appl. No. 14/504,721, filed Oct. 2, 2014, Office Action, dated Sep. 26, 2016.

(Continued)

*Primary Examiner* — Maikhanh Nguyen
(74) *Attorney, Agent, or Firm* — Hickman Palermo Becker Bingham LLP

(57) ABSTRACT

A method and apparatus for form processing is provided, requiring little to no data entry. Upon receiving an electronic notification containing a form, a validation server extracts an electronic contact address from the electronic notification. The validation server then applies a template associated with the sender's electronic contact address to a document to extract information necessary to generate an electronic form comprising machine parsable data. The sender is then granted access and prompted to validate the electronic form. The sender entity validates the electronic form by making any necessary changes or revisions and by submitting the editable web form. The form's parsable content is then stored directly as data in a database. In some embodiments, the validation server may accept the electronic validation with additional revision information. In these embodiments, the revision information may be applied to future forms received from the sender. Optionally, the revision information may also be used to create a new version of the template specifically associated with the sender's electronic contact address.

20 Claims, 10 Drawing Sheets

(56) References Cited

U.S. PATENT DOCUMENTS

| | | | | |
|---|---|---|---|---|
| 8,150,156 B2* | 4/2012 | Geva | ................ | G06F 17/243 382/175 |
| 8,660,294 B2* | 2/2014 | Comay | ................ | G06F 17/243 382/100 |
| 8,775,277 B2* | 7/2014 | Beach | ................ | G06Q 40/12 705/28 |
| 8,855,425 B2* | 10/2014 | Schmidtler | ........ | G06K 9/00442 382/182 |
| 8,879,846 B2* | 11/2014 | Amtrup | ............. | G06K 9/00442 382/190 |
| 2002/0120642 A1 | 8/2002 | Fetherston | | |
| 2002/0150300 A1* | 10/2002 | Lee | ................ | G06K 9/72 382/229 |
| 2004/0103367 A1 | 5/2004 | Riss et al. | | |
| 2004/0177326 A1 | 9/2004 | Bibko et al. | | |
| 2007/0154098 A1* | 7/2007 | Geva | ................ | G06F 17/243 382/209 |
| 2008/0285792 A1* | 11/2008 | Comay | ................ | G06F 17/243 382/100 |
| 2009/0099971 A1 | 4/2009 | Salemme | | |
| 2009/0198599 A1* | 8/2009 | Hui | ................ | G06Q 10/067 705/34 |
| 2010/0202698 A1 | 8/2010 | Schmidtler et al. | | |
| 2012/0084635 A1* | 4/2012 | Allen | ................ | H03M 7/3079 715/234 |
| 2013/0346331 A1 | 12/2013 | Giovannetti | | |
| 2014/0020073 A1 | 1/2014 | Ronda | | |
| 2014/0207631 A1* | 7/2014 | Fisher | ................ | G06Q 40/10 705/30 |
| 2014/0298421 A1 | 10/2014 | Johnson | | |
| 2016/0092423 A1 | 3/2016 | Wilczek et al. | | |
| 2016/0098779 A1 | 4/2016 | Wilczek | | |

OTHER PUBLICATIONS

Wilezek, U.S. Appl. No. 14/504,721, filed Oct. 2, 2014, Notice of Allowance, dated Jun. 2, 2017.

U.S. Appl. No. 14/504,721, filed Oct. 2, 2004, Restriction Requirement, dated Jan. 15, 2015.

U.S. Appl. No. 14/504,721, filed Oct. 2, 2014, Office Action, dated Jul. 7, 2015.

U.S. Appl. No. 14/502,894, filed Sep. 30, 2014, Office Action, dated Jan. 13, 2015.

U.S. Appl. No. 14/502,894, filed Sep. 30, 2014, Office Action, dated May 6, 2015.

U.S. Appl. No. 14/502,894, filed Sep. 30, 2014, Notice of Allowance, dated Nov. 5, 2015.

U.S. Appl. No. 14/504,721, filed Oct. 2, 2014, Final Office Action, dated Mar. 8, 2016.

* cited by examiner

601
Invoice Document

Example Corp. 605        Tax ID: 611  55-555555555         Invoice # 613      12345

Invoice Date 615  8/13/2014

607
Supplier Address
&
Contact Info                                                Client: 617       Example Buyer Terms: 619        Upon Receipt 609
Client Address
&
Contact Info 603
Logo Line Item Details 621

| Line | Type | Description        | Qty | Unit | Price    | Total     | Taxation |
|------|------|--------------------|-----|------|----------|-----------|----------|
| 1    |      | Laptop             | 10  | Each | 1,199.00 | 11,990.00 | 1,139.05 |
| 2    |      | Monitors           | 10  | Each | 150.55   | 1505.50   | 143.03   |
| 3    |      | Wireless Keyboards | 8   | Each | 69.00    | 552.00    | 52.44    |

Totals 623        28 Units 15,382.01 USD

FIG. 6

Validation Electronic Notification 801

SUBJECT: Your invoice to <<Client Name>>. Requires Your Validation

<<Hello,

Thank you for emailing your invoice to <<Client Name>>. We have imported your invoice data into <<Trademark>>, our innovative electronic invoice-processing platform.

By <<date>>, please take a moment to review the invoice data shown below (as imported) an confirm your acceptance of the invoice.

803

Click here to confirm your acceptance of the invoice as we entered it

805

Click here to modify your invoice in the <<Trademark>> Platform.

Thank you for confirming your acceptance of your invoice data and/or modifying the invoice by <<date>>. This will expedite your processing of your invoice for payment.

We also have the ability to email you payment information for this invoice once the invoice has been paid. Click here to receive an email once the invoice has been paid.

Thank you for your support!
<<Client Name>>

807

<<Inline Message of Invoice Data>>

|   | Field | Content |
|---|-------|---------|
| 1 | Invoice # | 15382.01 |
| 2 | Total Price | 12345 |

809

<<Attachment of Invoice Data in electronic form format>>

FEEDBACK VALIDATION OF ELECTRONICALLY GENERATED FORMS

CROSS-REFERENCE TO RELATED APPLICATIONS; BENEFIT CLAIM

This application claims the benefit as a Continuation of application Ser. No. 14/502,894, filed Sep. 30, 2014 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to computer-implemented template recognition using data extraction technology, and more specifically to feedback validation of electronically generated forms for more accurate data extraction and categorization.

BACKGROUND

Form processing requires extracting data associated with specified fields within a document and storing that data in a machine understandable format. Extracted information must be categorized as belonging to specified fields. Because of the variety of fields, schemas and data types available, form processing is often limited to specialized computing systems that automatically process forms for a particular industry. This automatic processing has two levels of errors. On a first level, the input data itself may be corrupt or contain errors. On a second level, the categorization may be incorrect. Approaches for minimizing these errors have been attempted.

One approach to minimizing form processing errors includes creating a web form that associates data with an input field before the data is input by a user. However, a user is not always available to input data into the categorized form fields. For industries where different entities generate large numbers of documents automatically, this approach is not scalable.

For example, sales are often processed by two different entities residing in two independent organizations. Rather than having immediate transfers of money with each transaction, many small businesses record each transaction in an accounts receivable ledger and generate an invoice once a month. Under this system, goods and services are transferred separately from the financial transactions, so payment is not made at the time of receiving the goods or services. Instead, payment occurs when an accounts payable entity matches a purchase order and a receiving report with data from an invoice. In this example, automatic form processing is desirable because many small business suppliers do not have the tools or personnel to create an integrated system with each buyer.

An approach for speeding up this process is using an invoice management system to perform optical character recognition (OCR) on the invoices and categorize the content of the invoices based on the OCRed information. For example, in the industry of invoice management, a specialized machine scans an OCRed document for a specific word such as "Price", and associates the next set of numbers with the price field. In the same manner, a specialized machine scans the document for "Purchase Order Number," and associates the next set of numbers with the purchase order number field. This approach is subject to error because a set of numbers following a field name does not necessarily associate with that field. For example, a document containing the words "Price" and "Purchase Order Number", may have price content close to the word "Purchase Order Number" and vice versa. Additionally, some invoices may contain multiple words that define the field category or no words that define a specified field. Such conflicts result in erroneous categorizations.

The current approach for handling conflicts of this nature involves outsourcing all invoice documents to a third party for validating the OCRed data extraction by visual inspection. If there is anything wrong with an OCR or categorization, the third party is required to fix the problem to the best of their ability. This approach is susceptible to automation errors associated with extracting data and categorizing it. This approach is also susceptible to human error, especially, because the third party does not have firsthand knowledge regarding the forms he or she is reading.

In addition to errors, the current approach has setbacks related to repetitious data input and data transfer. Specifically, the data must be entered by a supplier and transferred to a buyer as an invoice. The data is then extracted and transferred to a third party, where additional data entry may need to occur during the manual validation process. Then, the data is transferred back to the buyer where additional data entry may need to occur. For example, if the invoice amount is erroneously different than the purchase order price, additional data entry must occur, or the supplier needs to generate an entirely new invoice. Thus, the system breaks down when errors occur. An improvement is desired to eliminate the redundant computations associated with data entry and data transfer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6 is an invoice document illustrating an example form that may be processed.

FIG. 8 is an email notification illustrating an example electronic notification for granting access to a validation web form.

FIG. 9 is a validation web form illustrating a graphic user interface for editing an electronically generate form.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Many embodiments are described in the context of performing form processing on an invoice document because invoice documents have data and fields associated with the data in a template format. However, it is understood that an invoice is only a specific type of form with features required in form processing such as extracting data and sending and receiving data through multiple file types and protocols. The same principles apply to other forms, such as legal forms, purchase orders, quality assurance checklists, requisition documents, flyers, postage, and questionnaires.

General Overview

By using an electronic contact address associated with receiving a document, all forms coming from that electronic contact address may be extracted according to the same template. Additionally, the extracted data is sent back to the generating entity for validation before the data is input directly into a receiver's database. In this manner, electronically generated forms have little to no errors while streamlining overall form processing to prevent unnecessary data entry and data transfer.

Figure 1:
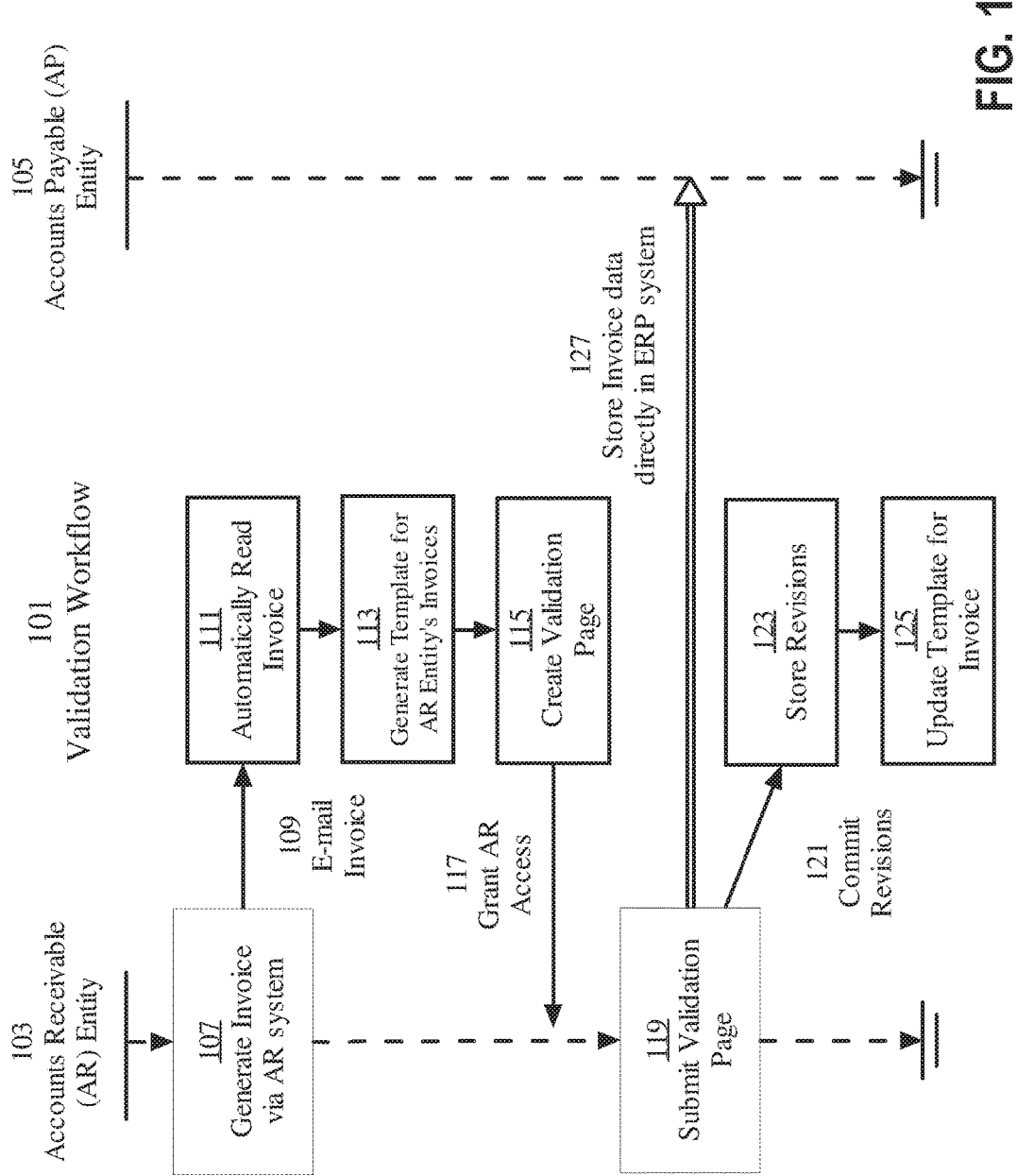
FIG. 1 is a flowchart illustrating steps of a scanning and validation workflow of a first form received from an Accounts Receivable (AR) entity.

For example, as presented in FIG. 1, a template validation workflow comprises an accounts receivable entity 103 sending an invoice 109 to an accounts payable entity 105, but the accounts payable entity receives a direct upload 127 of an electronically formatted and validated invoice. To start, the AR entity 103 generates 107 an invoice and automatically emails the invoice 109 to an intermediary validation server. The validation server automatically reads the invoice 111 and generates a template 113 for the invoice. The validation server then creates a validation page 115 and grants the AR entity 103 access 117 to the validation page. The AR entity 103 makes any necessary changes and submits the validation page 119 for direct upload 127 into the AP entities accounting software or electronic resource planning (ERP) software.

Additionally, when the AR entity 103 validates 119 an electronically generated form, revision information created by that user may be stored 123 or used to update 125 the template generated in step 113. In this manner, automatically read invoice data from future forms from that user are less likely to require repetitive human data manipulation during validation.

Figure 2:
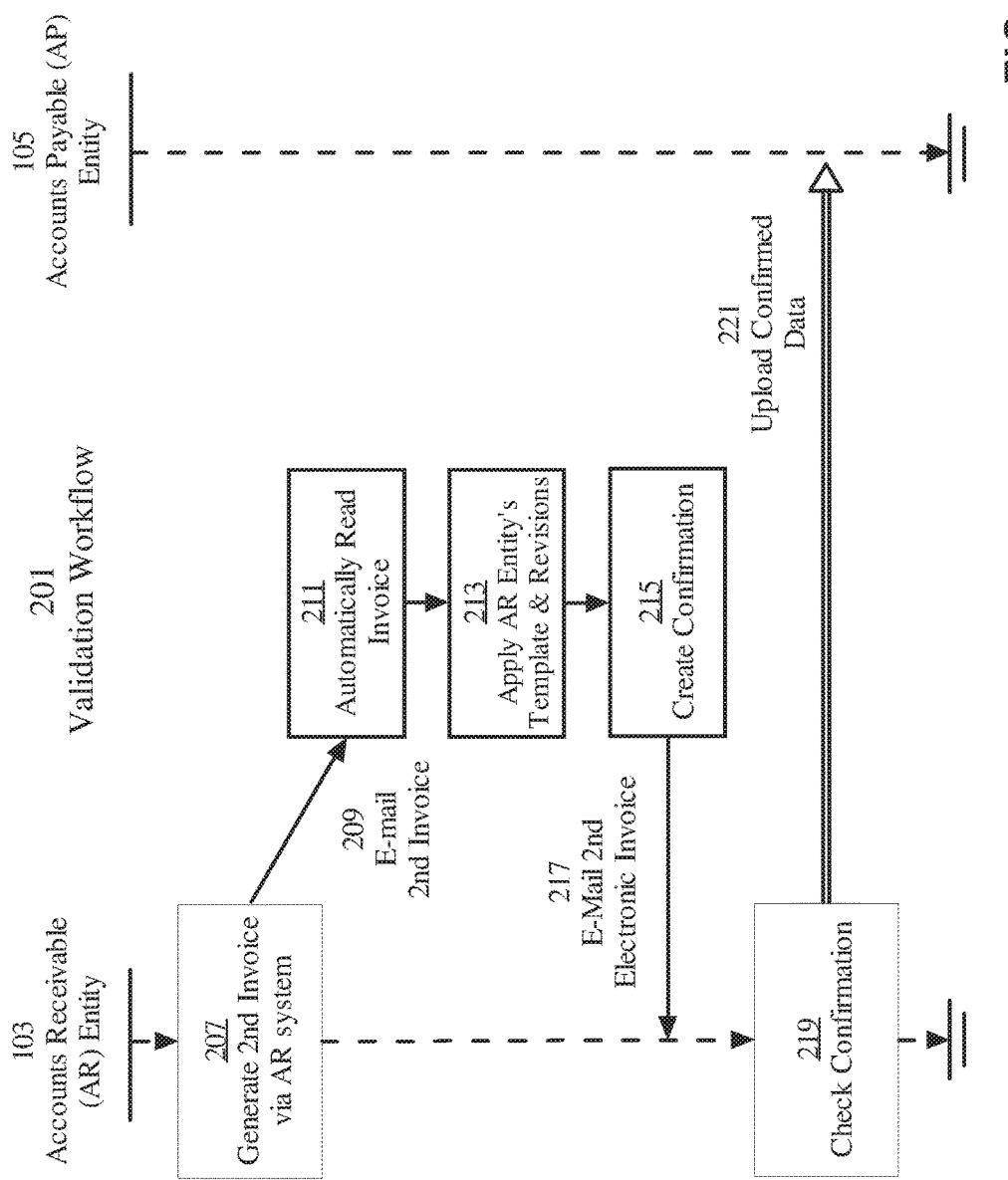
FIG. 2 is a flowchart illustrating steps for a scanning and validation workflow of a second form received from the AR entity from FIG. 1.

For example, as presented in FIG. 2, a template validation workflow comprises an accounts receivable entity 103 sending a second invoice 209 to an accounts payable entity 105, but the accounts payable entity 105 receives a direct upload 221 of an electronically formatted and validated invoice. To start, the AR entity 103 generates 207 an invoice and automatically emails the second invoice 209 to an intermediary validation server. The validation server automatically reads the invoice 211 and applies a template 213 to the invoice generated from step 113 and updated in step 125. The validation server then creates a confirmation 215 of the $2^{nd}$ electronically formatted and emails the electronic invoice 217 in an electronic notification to the AR entity 103. The AR entity 103 only needs to click a link to confirm that electronically formatted invoice is correct 219 for direct upload 221 into the AP entities accounting software or electronic resource planning (ERP) software.

System Architecture

Figure 3:
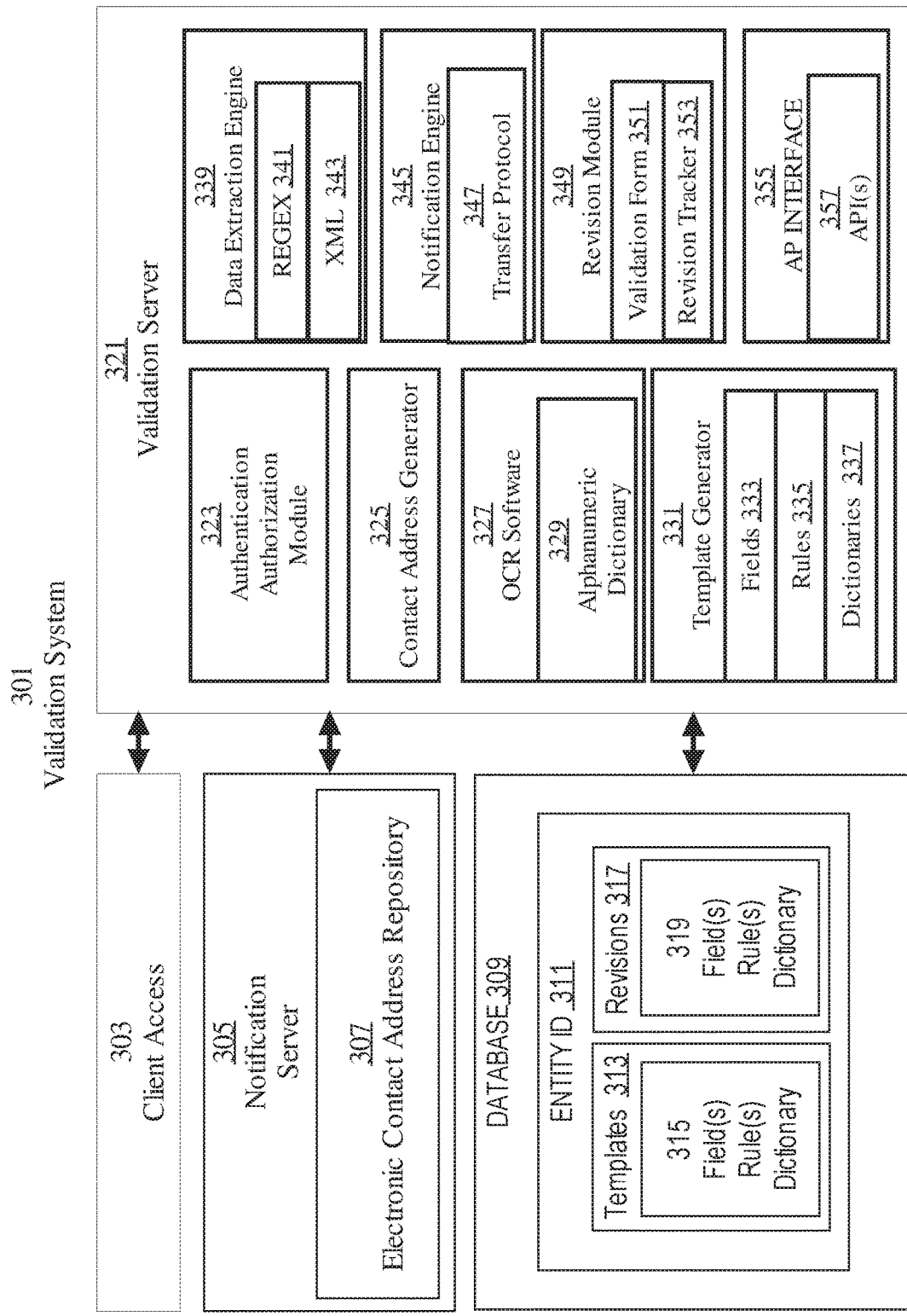
FIG. 3 is a block diagram illustrating a validation system for form processing.

In some embodiments, a notification server is configured to couple with a validation server further comprising an authentication and authorization module, a template generator, OCR software, a data extraction engine, a revision module, and an accounting software interface. These modules additionally have access to a database for storing templates and revisions associated with electronic contact addresses for transforming an OCRed document into an electronic form. For example FIG. 3 presents a validation system architecture with these features.

In some embodiments modules are placed on a single validation server. In other embodiments, the system is practiced in a distributed computing environment where tasks are performed by specialized remote processing devices that are linked through a communications network. In a distributed computing environment, modules may be located in both local and remote systems.

In some embodiments, the database is located on a single server. In other embodiments, the database is located in a multi-node cluster. In still other embodiments, the database is located in a distributed computing environment, wherein new data is stored in local storage, while long term storage located in one or more remote storage devices.

Electronic Notification Server

In some embodiments, an electronic notification server 305 is configured to send and receive electronic notifications according to one or more standardized protocols. The server sends and processes messages for a registered network or domain. In some embodiments, a validation server generates an electronic contact address for each client 303 authorized to receive form documents in the network. The electronic contact addresses are made according to the application level protocol in which the messages are received. For example, an SMTP server receives an email in the format name@domain.com, so an electronic contact address generator 325 creates electronic contact addresses for each client in that format.

In some embodiments, other application level protocols are used to receive an electronic notification. A user may have one or more electronic contact addresses to receive electronic notifications through one or more application level protocols. These protocols include, but not limited to, Gadu-Gadu, IRC, Windows Messenger service, MSNP, Mumble, OSCAR, RVP, SIP/SIMPLE, Skype, TOC2, XMPP/Jingle, YMSG, and Zephyr Notification service. An electronic contact address is chosen from a group comprising username, user ID, email address, screen name, handle, avatar, IP address, or other identifying information.

Electronic Contact Address Repository

In some embodiments, the validation server is configured to receive automatically generated notifications. These notifications may be sent by a server running a script ("bot") that does not receive return messages. In such situations, the validation system maintains a repository 307 of electronic contact addresses associated with the contact addresses used to send the automated notification, but also provide access to human beings. These additional electronic contact addresses are substituted for the electronic contact addresses that do not receive return messages. Examples of automated electronic notifications that do not receive return messages include, but are not limited to, bots for email, fax, instant message, SMS, web payloads, and messaging through a website or social network. Examples of electronic notification addresses that may be associated with these "no reply" electronic notification addresses include, but are not limited to, a PO delivery email address, an invoice validation address, an invoice validation escalation address, or any combination thereof.

OCR Software

In some embodiments, OCR software provides an engine that converts scanned images or flat PDF files into searchable documents. OCR software may contain many dictionaries of images that are associated with specific characters. OCR software may additionally contain font recognition and coordinate mapping. For font recognition, one or more fonts are determined to be within a document before the OCR software scans the entire document, such that specific characters are more accurately determined. Dictionaries of different characters, fonts, and so forth may be located locally or remotely to the validation server.

In some embodiments, an OCRed document may be compared against one or more text files to more accurately convert the OCRed characters. For example, some invoicing applications provide a plain text version of an invoice and a PDF version of an invoice. Sequences of plain text may be compared against the OCRed characters to change characters that were incorrectly recognized.

In some embodiments, character recognition may be augmented by supplemental dictionaries that can be associated with specific entities or templates. These augmented dictionaries may be stored in their own repository or with the templates in the template repository.

Template and Revision Database

In some embodiments, standard templates are made for invoicing applications known in the art. These templates provide extraction information such as character coordinates for specified fields, XML schemas for marking up an OCRed document, dictionaries for font types, regular expression data for defining expected character strings, and additional rules for defining specified fields when a required field does not exist for the template. For example, in the field of invoice management, some invoicing applications do not generate an invoice with its associated purchase order (PO) number. A template prevents the data extraction module from extracting data for that particular field, and instead, the template places a default PO number in the stead of the missing data. A template may also provide additional rules on searching other data structures for finding a PO number to associate with open invoices. For example, an electronic notification of an invoice from a particular contact address may provide a link that contains PO number information about the invoice. The template may provide rules to use the URL associated with the link to extract the additional information regarding the invoice.

The template repository 309 may be searched based on electronic contact address or keywords within the body of the electronic notification, an OCRed attachment, the subject line of the electronic notification, the domain name of the sender, or the IP address of the sender. By comparing the text of an electronic notification with a list of names, keywords, colors, and character coordinates associated with specific templates, a template for data extraction may be found for each known template in the industry.

For example, in the art of invoice management known invoicing applications such as Quickbooks®, Freshbooks®, Netsuite®, Basware®, Tradeshift®, and other invoicing applications generate invoices according to one or more standardized formats. An automated email of an invoice from one of these applications often has a line describing the product from where it came. Some of these invoicing applications further generate different invoices based on the types of goods or services sold. One or more templates may be stored for each type of invoicing application and additionally organized based on sub-categories of formats for that particular invoicing application.

Template Generator

In some embodiments, templates are automatically created for an OCRed document where a predefined template cannot be found. Template generating involves extracting specified field names from the document and defining bounded areas around those field names. The template comprises one or more bounded areas with a key word or character associated with the bounded area. For example, if a field such as "purchase order number" is specified, a regular expression searches the OCRed document for "PO number," and the closest set of alphanumeric characters are defined as the PO field.

In some embodiments, the bounded area is defined by specific shapes positioned on or around a matched word, including but not limited to squares, rectangles, ellipses, ovals, circles, or polyominoes such as the Tetris® "z."

Data Extraction Engine

In some embodiments, the data extraction engine receives an OCRed document and searches for a template or XML schema markup and performs regular expressions from a dictionary of regular expressions on defined fields overlaid on the OCRed document. The regular expressions may search for any alphanumeric character within a field, or they may scan for sequences involving special symbols or characters such as '$', '#', or even ',' depending on the field and template used. For example, a price in the price field may have the format of a '$' followed by a series of commas and numbers, while a PO number may have a '#' followed by a series of alphanumeric characters and dashes.

The extracted data is associated with the field name it was extracted from, and placed in a data structure or inserted into a database. In some embodiments, revision information is applied to the extracted data before being placed in a data structure or inserted into a database in order to account for repetitive errors.

In some embodiments, the data extraction engine overlays a template on an OCRed document. Specific bounded areas within the document are marked up according to an XML schema. The OCRed document is marked up as an XML document by adding the necessary headers and tags associated with the XML schema based on the OCRed data having content within bounded areas defined by the template. After content is found within a bounded are, an element start tag is added to define one or more character strings until a delimiter is discovered. An end tag for that element is added to that group of OCRed characters, and the next element start tag is added. Further regular expression matching and XML markup may be performed within the elements after they are defined.

Revision Module

In some embodiments, a revision module generates unique web pages comprising an electronic form in an editable format. The form is configured to accept revisions to field categorizations and associated content. The form may have specific tools or buttons that enable a user to edit the form. For example, an editable form may have a swap tool that allows a user to swap data between two fields. Additional tools may include drawing tools to edit the bounded areas defining a template for OCRed documents from a particular electronic contact address. The editable form may also accept traditional word processing commands such as cut, copy, and paste. Delimiters may be further defined with key strokes such as enter, tabs, deletions, and alphanumeric characters.

Figure 9:
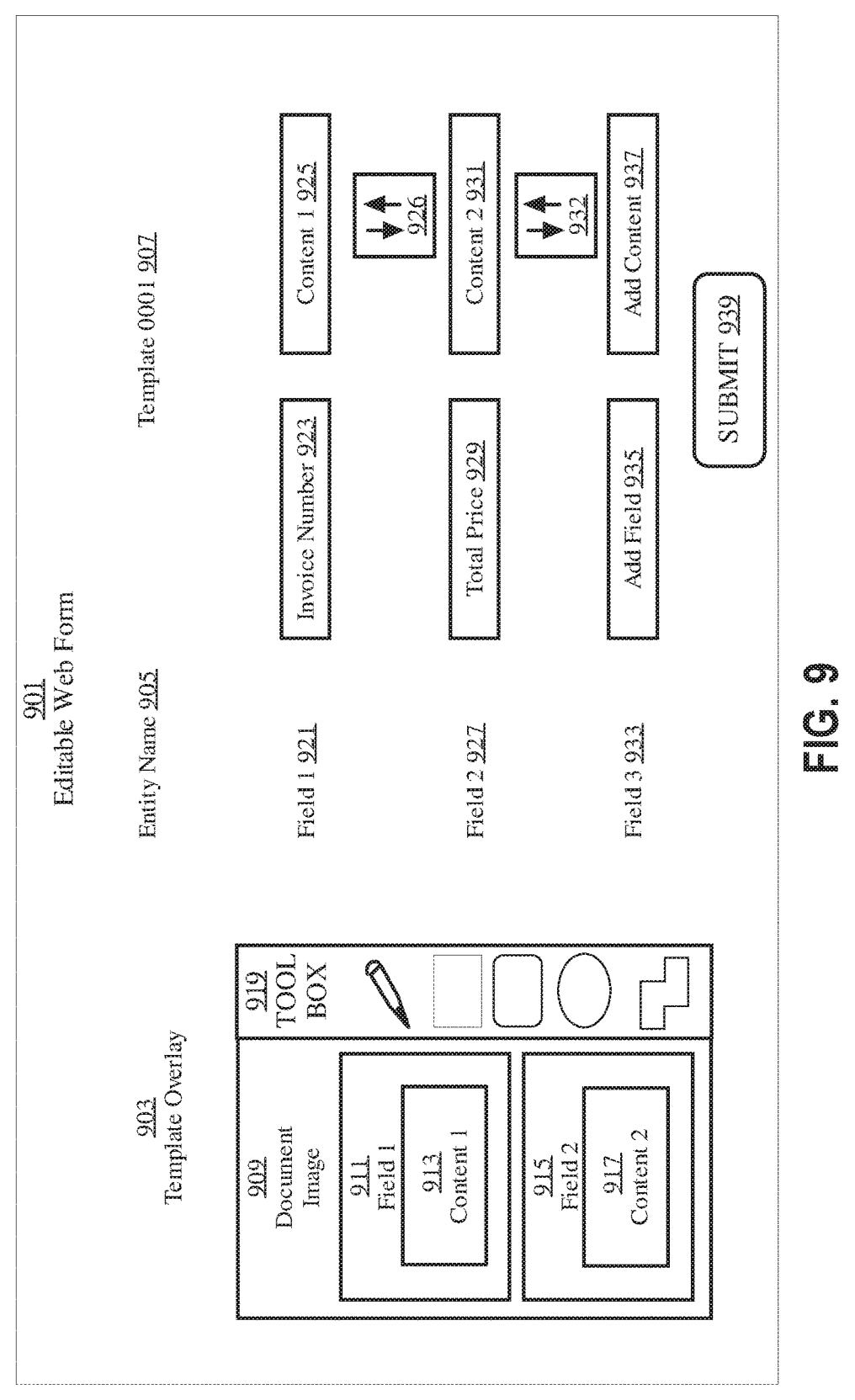

An example graphic user interface is presented in FIG. 9. The editable web form 901 has graphic depiction of a template overlay on the image of a document 909. In this template overlay 903, there a document image 909 with various fields 911, 915 drawn on top of the document. A first set of content 913 from a first field 911 is extracted and placed in an electronic form of an invoice 907. The first field 921 is defined as an invoice number 923, and the content 925 of the first field is transferred to the electronic invoice 907. The second field 927 is defined as a price 929, and the content 931 of the second field is transferred to the electronic invoice 907. If a field is over inclusive or under inclusive, such that the data extraction engine is extracting too much or too little content from the document image 909, a user may use the drawing tools 919 to redefine or resize the bounded area for that particular field. Additionally, a user may use the swap tool 926 to swap content if the content was incorrectly associated with a field.

In some embodiments, the revision module additionally comprises a script for recording actions taken on each uniquely created editable form. Actions may be recorded as macros or updates to the template associated with the form. For example, use of the swap tool 926 on the price 929 and invoice number 923 data is tracked and stored as a revision record.

Revision information may also include lower layer changes made to an XML schema or element tags (not shown). In this case, the revision information may be stored as associated with a specific electronic contact address, a template, or any combination thereof.

Electronic Form Storate Interface

In some embodiments, an electronic form storage interface is a controller file for inputting an electronic form directly into a database. This may involve XML shredding or simply taking any parsed data and placing it in its associated fields in a database.

In some embodiments, the data entry interface refers to sending data to accounting software. The accounting software may be local to the validation server or the interface may only provide an applications programming interface (API) for entering data directly into proprietary software or databases. In still other embodiments, the interface places payment information from an invoice in a queue.

In one embodiment, the interface performs its functions through an internet connection. Access may be encrypted, and payloads may be compressed according to encryption and/or compression techniques known in the art. The AP interface may have direct access to AP proprietary software through an API. These APIs may be standardized such as Simple Object Access Protocol (SOAP) or Representative State Transfer (REST), or they may be proprietary.

In other embodiments, the interface performs its functions locally or through an intranet connection. Data may be transferred using an API, a proprietary transfer protocol, or through direct access to internal files and network devices.

Implementation

In some embodiments, the form processing workflow is implemented by setting up a proxy electronic contact address for receiving electronic notifications of forms. Any electronic notifications sent to the proxy validation server are processed by extracting an electronic contact address of the form sender. The validation server then performs data extraction through OCR, template overlay or XML markup, and regular expression matching. Validation is automated by sending the extracted data back to the electronic contact address or an associated electronic contact address for validation. Finally, the electronic form is entered directly into an AP system.

Figure 4:
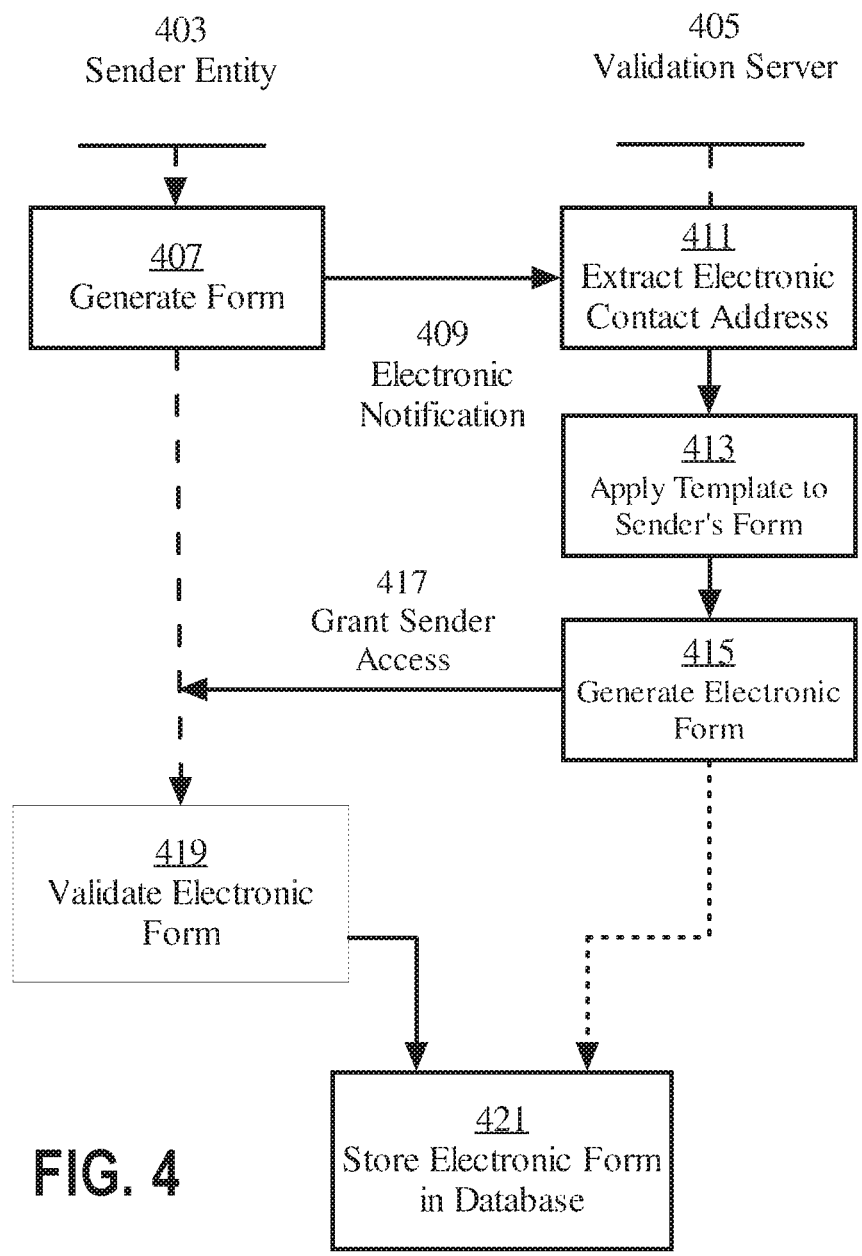
FIG. 4 is a flowchart illustrating steps of a form processing workflow leveraging the electronic contact address from the sender.

For example, FIG. 4 illustrates a form processing workflow where little to no data entry is required. A sender entity 403 generates 407 a form and sends the form to a validation server 405 via an electronic notification 409. Upon receiving the electronic notification 409, the validation server 405 extracts an electronic contact address 411. The validation server 405 then applies 413 a template associated with the sender's electronic contact address to the invoice to extract information necessary to generate 415 an electronic form comprising machine parsable data. The sender entity 403 is then granted 417 access and prompted to validate the electronic form. The sender entity validates 419 the electronic form by making any necessary changes or revisions and by submitting the editable web form. The form's categorized content is then stored 421 directly as data in a database. In some embodiments, the sender entity may accept the electronic validation form without actually going to the web page. In these embodiments, the electronic form generated in step 415 is stored 421 directly in the database.

Figure 5:
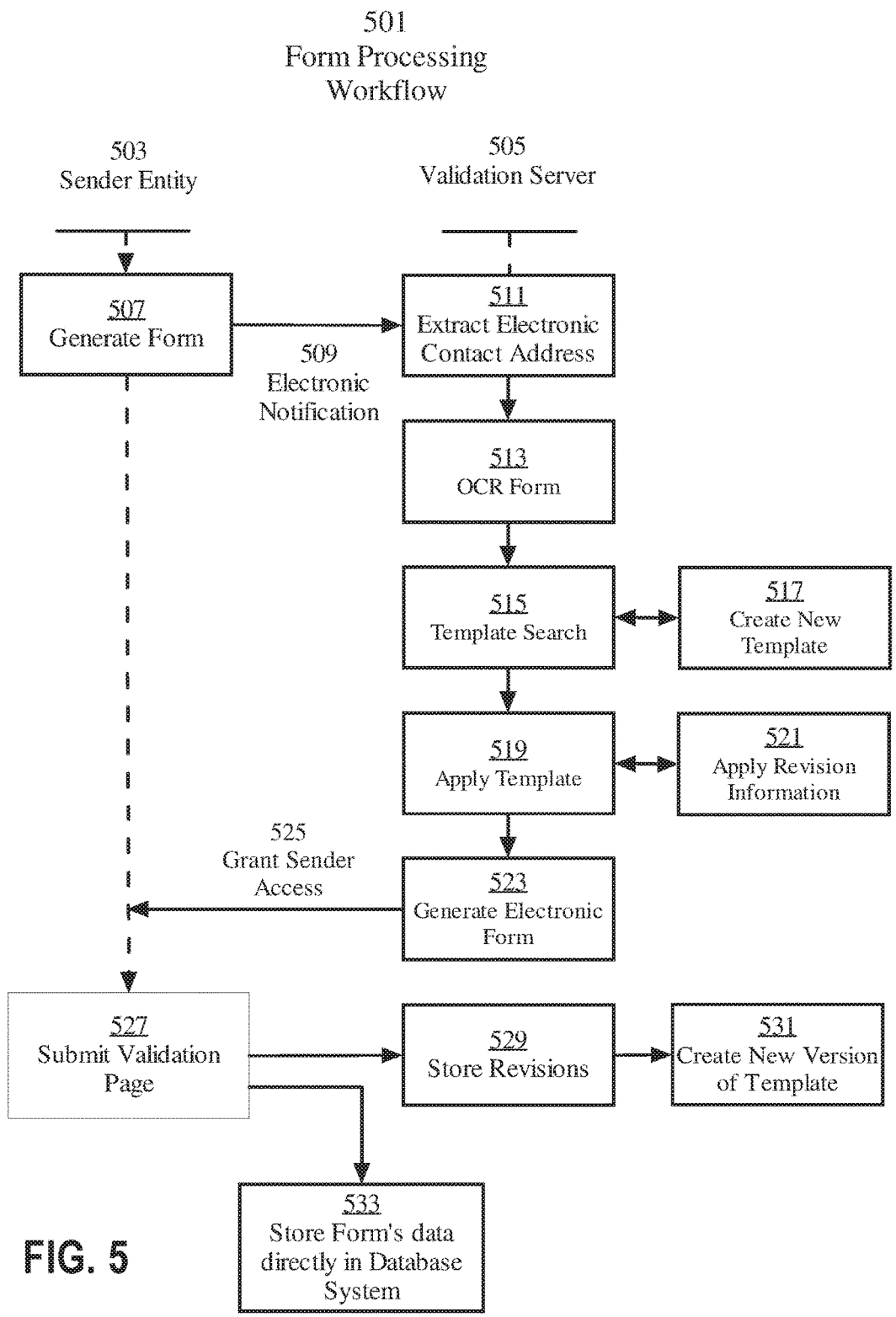
FIG. 5 is a flowchart illustrating steps for a form processing workflow for automating validation feedback received by a sender.
Figure 7:
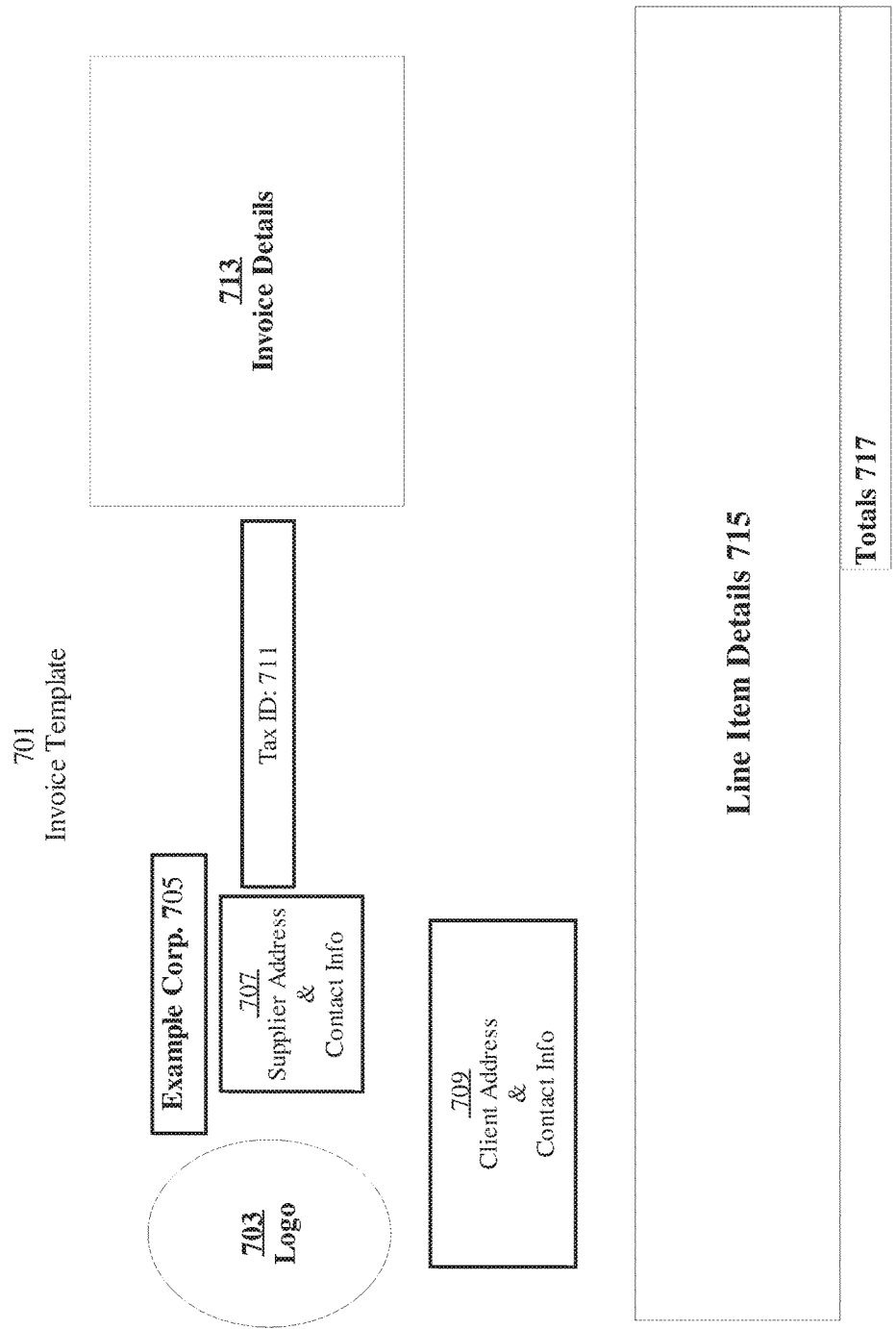
FIG. 7 is a block diagram of a template illustrating an example structure that may be overlaid on the invoice document presented in FIG. 6.

In some embodiments, the validation server creates templates and leverages revision information applied to those templates. For example in FIG. 5, illustrates a form processing workflow where little to no data entry is required with additional features of template creation and automated application of validation feedback revision information. A sender entity 503 generates 507 a form and sends the form to a validation server 505 via an electronic notification 509. Upon receiving the electronic notification 509, the validation server 505 extracts 511 an electronic contact address. The validation server 505 then applies an OCR 513 algorithm to the document. With the extracted contact address from step 511, the validation server performs a template search 515 for a template associated with the sender's electronic contact address. If no template is found, the validation server creates a new template 517. The validation server then applies the found or created template 519 to the OCRed document. The sender entity 503 is then granted 525 access and prompted to validate the electronic form. The sender entity validates 527 the electronic form by making any necessary changes or revisions and submitting the editable web form. The form's categorized content is then stored 533 directly as data in a database. In some embodiments, the validation server may accept the electronic validation form with additional revision information. In these embodiments, the revision information may be applied 521 after applying a template if necessary. Optionally, the revision information may also be used to create a new version of the template found in step 515 of created in step 517.

Proxy Setup

In some embodiments, a client registers with a validation server 505 to create a proxy receiver. Authentication credentials for each user may be created in a traditional manner by requiring each user to register a username and password. After registering, the validation server generates an electronic contact address for the user.

As presented in FIG. 3, a client registers under the authentication and authorization module 323, which involves creating a username and password. The authentication module 323 then prompts the contact address generator 325 to create a new electronic contact address based on the username of the registered user, and the domain of the notification server 305.

In some embodiments, the clients may configure settings individually or globally. In a global configuration, the electronic contact address is sent to all individuals or entities that send the user forms to be transformed into electronic forms. This may be an automated or manual process. For example, a small business may have a plurality of suppliers. A list of these suppliers called a chart of accounts may be uploaded to the validation server, so the validation server can send an electronic notification to each supplier stating a change in electronic contract address of the small business. In an individual configuration, a client may determine specific suppliers to opt in or out of the system. Additional settings may include configuring the system to use specific electronic contact addresses associated with a supplier such as a PO delivery email address, an invoice validation address, an invoice validation escalation address, or any combination thereof.

While normally a sender entity 503 sends a form document to a receiver as an email with a portable document format (pdf) attachment, in FIG. 5, the receiver uses the validation server 505 as proxy by giving the sender entity a contact address generated by the validation server. For example, instead of sending invoices directly to the buyer, an AR entity sends these messages to the validation server, which are then routed through the validation server modules to transform the document into an electronic form.

Sender Entity Setup

In some embodiments, there is an automatic trigger for sending automated notifications to notification server 305. An example of notification system that sends automated notifications is an Accounts Receivable system (AR system). The AR system automatically generates and sends a batch of invoices to every customer once a month. Other triggering events include, but are not limited to, automatically invoicing for a project or billing after a threshold amount of sales have been reached.

For example, after a triggering event, a notification system for an accounts receivable entity automatically emails an invoice to a buyer. The invoice is sent as an email attachment. However, other examples exist where the form is sent as plain text in the body of an electronic notification. In some embodiments, the form to be processed is transferred using more than one type of transfer. For example, an invoice notification may be sent in an emailed as a PDF attachment and as plain text within the body of email. In both cases, the sender transmits the electronic forms to a receiver proxy such as notification server 305.

Extracting an Electronic Contact Address

In some embodiments, a PDF document is received through an automated electronic notification such as an email. The electronic notification is associated with at least one electronic contact address such as an email address. This electronic contact address is extracted 511 from the electronic notification, and the electronic contact address is associated with the document.

For example, an SMTP server receives an automated email and searches for the SMTP command "MAIL FROM:" to extract the sender's email address. This email address may be compared against a repository of associated email addresses if the automated email sender does not receive return emails. If other application level protocols are used, then extracting a sender contact address is performed according to the respective protocol.

In some embodiments, sender contact address is extracted from the body of the electronic notification or the streamed or attached document. For example, an electronic contact address may be extracted from field 607 in FIG. 6. In this embodiment, an application specific regular expression or matching algorithm may be used to associate a contact address with the sent document.

Electronic Form Generation

In some embodiments, electronic form generation comprises performing optical character recognition 513 on a document to gain a set of recognized characters. A template search involves pulling templates associated with the electronic contact address and comparing the document with other key information. Identification of a template may be additionally determined through additional recognition of bar codes, QR codes, symbols, or even logos. For example, logo 603 in FIG. 6 may be associated with invoice generation software that indicates a type of template.

By applying a template 519 associated with the extracted electronic contact address, an XML schema is added to the OCRed document. The template may increase the accuracy of an OCR and data extraction by the use of dictionaries, rules, and other information associated with the extracted electronic contact address. The document is thus transformed into an electronic form that may be viewed as a web page and parsed for specific segments of information.

In some embodiments, the template is defined as a list of fields within bounded areas. These fields include, but are not limited to, a supplier name, a status, an invoice number, an invoice date, an invoice control total, a supplier note, a data source, a reject field, an image scan, other attachments, a payment term, a chart of accounts field, a remit-to field, a location code, a PO line, tax information, a contract field, a billing field, a period field, a UNSPSC field, or any combination thereof.

These fields may also include some or all of the data related to a purchase order that may already be existing within the system. These fields include, but are not limited to, a logo for the supplier, a logo for the buyer, a brand name, a supplier name, a supplier address, a buyer shipping address, a buyer billing address, a purchase order number, a date, payment terms, shipping terms, currency type, contract information, contact information such as name, phone number, email address, fax, or username for a messaging service, line item descriptions of goods further including quantity, batch pricing, price, sub-total pricing, total pricing, total number of units, or any combination thereof.

For example, invoice document 601 contains a logo 603, some contact information 607, 609, and some invoice details 611-619, in addition to line item details 621. This invoice document may be OCRed using the OCR software 327. Using a template 701 overlaid on to the OCRed document an using an XML markup of the OCRed document, specific regions or elements within the document may be extracted as a string of content associated with each field.

Each specific region of a template 701 is associated with an XML, schema. For example, Line Item Details 715 may have a schema comprising a root element "invoice table" with child elements "description", "price", "quantity", and "total". Once the template matches a table of description, price, quantity, and total, a root tag "<invoice table>" is added to the front of the matched words. Then a nested "<description>" tag is added to the next set of words, until a delimiter such as a tab is found. The "</description>" tag is added to end to make well-formed XML and the next element is started, "<price>". After exhausting content on the first line, a second description element tag is started on the second line, and the process is repeated. An end tag </invoice table> may be added in response to a different type of delimiter, a specific word (such as "Total"), a font type such as bold, or matching any other computer recognizable feature of the document.

Granting Access to a Validation Form

In some embodiments, access is granted to the validation form through a link sent in an electronic notification to the electronic contact address associated with the sender of the original document. In some embodiments, access is granted to the validation form by authorizing the electronic notification contact address to access the validation form. Authentication credentials for the authorized user may be created in a traditional manner by requiring each user to register and associate an electronic contact address with the user. Authentication credentials may be automatically created upon receiving an automatic electronic notification. For example, a user with a username of the electronic contact address is created and a password is sent to the user in a reply electronic notification.

In some embodiments, access is granted to the validation form by an electronic notification with a deep link to the validation form that is automatically sent to the electronic contact address. For example, in some embodiments, authentication is made according to methods of taking an electronic contact address and temporarily granting access to a security sandboxed portion of the system.

For example, an electronic notification 801 in FIG. 8 may be sent as an email to the sender of the original form document. The electronic notification comprises a confirmation link 803 and a link granting access to the validation form 805. The electronic notification additionally comprises an inline message of the extracted data with its categorizations 807, and an attachment of the invoice data in an electronic form format 809.

In some embodiments, a sender entity may be required to access the validation form within a specified time period or the form is rejected. Such embodiments may include an "escalation" electronic notification, where the validation server sends a reminder notification after another time period if no validation has yet occurred. If no response is given within the time period, the form may be sent back to the sender as rejected. Other embodiments, include having the validation server notify the client that the electronic form was never validated, so the client may review the electronically parsable form.

In order to encourage users and sender to use the system properly, the system may include statuses of each form. For example, if an electronic form has not been created, but not validated, a status may include "validation pending". If the time period for accessing a validation form has expired, the status may include "Validation Window Expired-Needs Review." If an electronic form has been created and validated, the status of the form may read "Validation Complete." These statuses may be viewable through the validation system or sent as positive/negative feedback notifications throughout the form validation process. Additional positive feedback may be included for the sender in the form of graphical representations of money or coupons and further incentives for performing a validation. A spectrum of graphical representations may be employed that correlates to timeliness of a validation.

Validation Form

In some embodiments, an editable html form is created using the extracted data and associated fields. FIG. 9 illustrates web form with swappable fields that may be performed by a user validating an invoice. For example, after an electronic contact address has been extracted from an electronic notification and no template is found associated with that electronic contact address, the template generator may generate a template over the invoice 601. The Invoice Number field 613 is associated with 15,382.01 content 623, and the total price field 623 is associated with the #12345 content 613.

A validation form 901 has the fields and associated content from invoice 601, but the content is incorrectly categorized. Thus, invoice number 923 from the first field 921 has 15,382.01 content 925, and total price 929 from the second field 927 has 12345 content 931. Upon reaching FIG. 9, a user may use the swap tool 926 to switch the content and field associations.

Controls on Illegal Changes

In some embodiments, additional scripts are added to pages generated from the revision module. These scripts prevent users from deliberately or accidentally changing an editable form such that the information is clearly erroneous. For example, in invoice processing, the price fields from an invoice are matched with the price fields of a purchase order. Although the pricing may be slightly different due to taxes, the price of the electronically formatted invoice is required to be within a specified tolerance level of the purchase order price. This tolerance may be adjustable based on the direction of the change. For example, a price change cap of 15% may be implemented to account for taxes, but a price change floor of 75% may be implemented to account for discounts.

Automating Revision Information

In some embodiments, revision information is used to edit extracted data from future documents sent by the same or an associated electronic contact address. For example, if a macro was stored as revision information, a second document sent by the same electronic contact address may be received. After data extraction and translation of the information to an electronically parsable format, all of the revision steps are performed on the second document by the macro instead of a human user. After these steps are performed, the sender is sent an electronic notification of the extracted data after it has been revised. The electronic contact address may still be granted access to the validation form using one or more of the steps indicated in the validation form section, but the human user is less likely to need to use the form to make edits. Thus, repetitive data input is eliminated from the form processing of documents received from the same electronic contact address.

Interface with Accounts Payable Accounting Software

In some embodiments, the validation server is interfaced with accounting software having an accounts payable system such that the extracted and validated data is directly entered into the accounts payable system. Thus, after receiving the validated extracted data from the OCRed document with the revisions from the validation form, the data is stored directly in a database for the accounting software in the data structure for the accounts payable ledger.

Accounting software is application software that records and processes accounting transactions. The software may be integrated with other business management systems such as E-Procurement and Enterprise Resource Planning software. The system is designed for a single entity to have an integrated view of core business accounts using a database management system. With this system, a single entity may track accounts payable, accounts receivable, payroll, and trial balance. Because the system aggregates a plethora of useful information, the system may provide an application programming interface (API) for accessing data in the system directly. Because some of these systems provide functionalities such as automatic payment, access to the system by arm's length entities must be limited to specific import and export functionalities.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
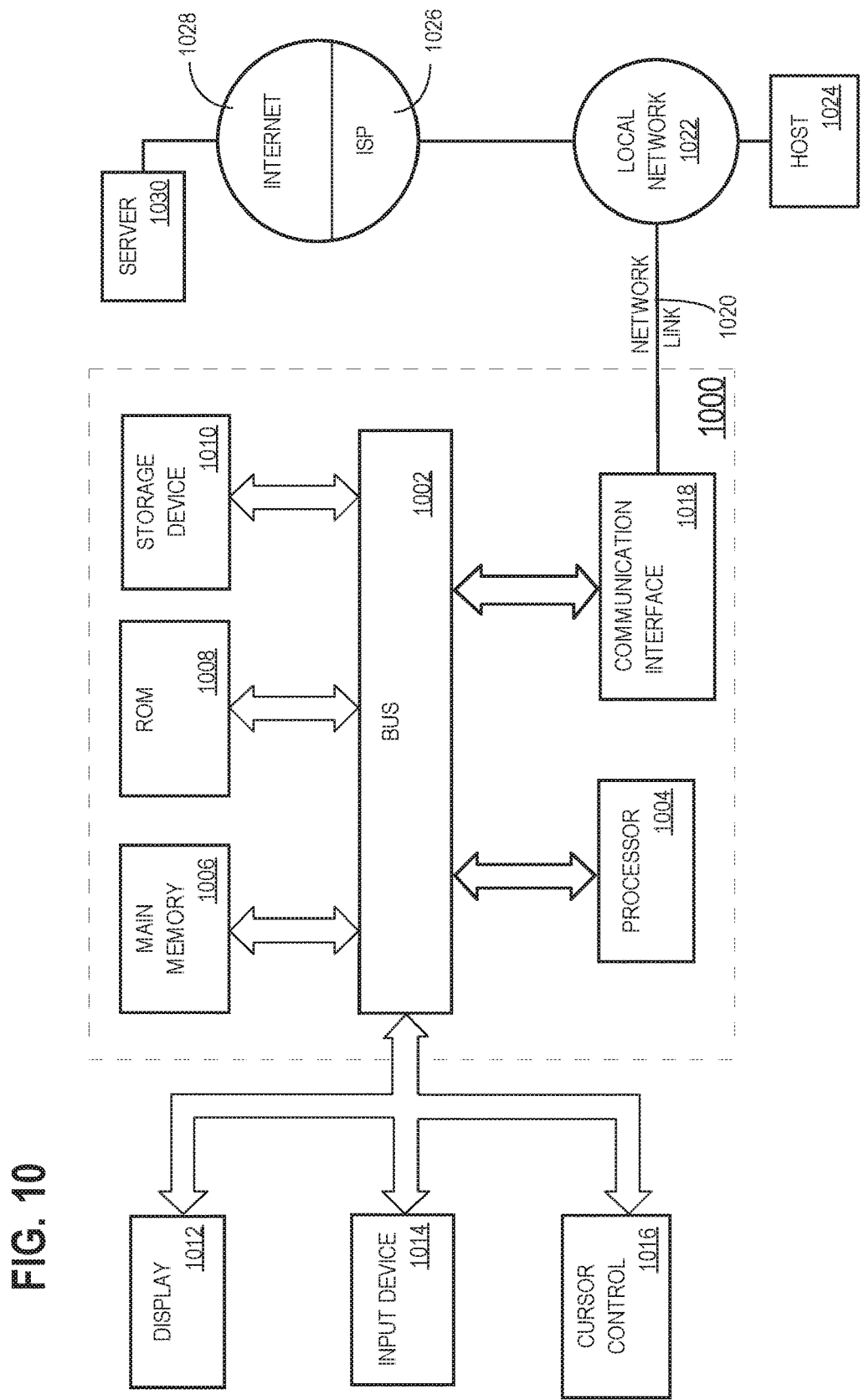
FIG. 10 is a block diagram illustrating a computer system that may be used to implement the techniques described herein.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a plurality of templates that provide field specification data for identifying one or more fields from corresponding documents;
   determining that a first document corresponds to a particular template of the plurality of templates;
   generating a first electronic validation form using the particular template,
   wherein generating the first electronic validation form using the particular template includes performing a data extraction process on fields identified by the particular template,
   wherein the first electronic validation form comprises a particular field identified from the first document using the field specification data in the particular template,
   wherein the first electronic validation form comprises one or more controls to accept at least one revision to the particular field, a particular data item, or an association between the particular field and the particular data item obtained from the first document;
   upon receiving an input through the one or more controls, generating revision information for the particular template; and
   in response to determining that a second document corresponds to the particular template, generating a second electronic validation form using the particular template and automatically applying the revision information to the second electronic validation form,
   wherein the generated revision information changes a dictionary mapping associated with the data extraction process;
   wherein the method is performed by one or more computing devices.

2. The method of claim 1, wherein
   determining that the first document and the second document corresponds to the particular template includes detecting from each document a template identifier, and comparing the template identifier to a plurality of template identifiers that correspond to the respective plurality of templates.

3. The method of claim 2, wherein the template identifier is a particular logo that occurs both within the first document and the second document.

4. The method of claim 1, wherein the one or more controls includes a control to revise the particular field.

5. The method of claim 1,
   wherein the particular template identifies locations of fields within a corresponding document, and
   wherein the one or more controls include a control that changes a location of the particular field.

6. The method of claim 1, wherein the one or more controls includes a control to revise the particular data item.

7. The method of claim 1, wherein the one or more controls includes a control to revise the association between the particular data item and the particular field.

8. The method of claim 1, wherein the generated revision information changes a location of the particular field as identified by the particular template.

9. One or more non-transitory computer readable media storing instructions which, when executed by one or more computing devices, cause performance of:
   storing a plurality of templates that provide field specification data for identifying one or more fields from corresponding documents;
   determining that a first document corresponds to a particular template of the plurality of templates;
   generating a first electronic validation form using the particular template,
   wherein generating the first electronic validation form using the particular template includes performing a data extraction process on fields identified by the particular template,
   wherein the first electronic validation form comprises a particular field identified from the first document using the field specification data in the particular template,
   wherein the first electronic validation form comprises one or more controls to accept at least one revision to the particular field, a particular data item, or an association between the particular field and the particular data item obtained from the first document;
   upon receiving an input through the one or more controls, generating revision information for the particular template; and
   in response to determining that a second document corresponds to the particular template, generating a second electronic validation form using the particular template and automatically applying the revision information to the second electronic validation form,
   wherein the generated revision information changes a dictionary mapping associated with the data extraction process.

10. The one or more non-transitory computer readable media of claim 9, wherein
    determining that the first document and the second document corresponds to the particular template includes detecting from each document a template identifier, and comparing the template identifier to a plurality of template identifiers that correspond to the respective plurality of templates.

11. The one or more non-transitory computer readable media of claim 10, wherein the template identifier is a particular logo that occurs both within the first document and the second document.

12. The one or more non-transitory computer readable media of claim 9, wherein the generated revision information changes a location of the particular field as identified by the particular template.

13. The one or more non-transitory computer readable media of claim 9, wherein the one or more controls includes a control to revise the particular data item.

14. The one or more non-transitory computer readable media of claim 9, wherein the one or more controls includes a control to revise the association between the particular data item and the particular field.

15. A system comprising:
a database configured to store a plurality of templates that provide field specification data for identifying one or more fields from corresponding documents; and
a validation server computer, operatively coupled to the database, comprising one or more processors and one or more non-transitory computer readable media with instructions to:
determine that a first document corresponds to a particular template of the plurality of templates in the database;
generate a first electronic validation form using the particular template,
wherein generating the first electronic validation form using the particular template includes performing a data extraction process on fields identified by the particular template,
wherein the first electronic validation form comprises a particular field identified from the first document using the field specification data in the particular template,
wherein the first electronic validation form comprises one or more controls to accept at least one revision to the particular field, a particular data item, or an association between the particular field and the particular data item obtained from the first document;
generate revision information for the particular template using input received through the one or more controls;
determine that a second document corresponds to the particular template; and
generate a second electronic validation form using the particular template and automatically applying the revision information to the second electronic validation form,
wherein the generated revision information changes a dictionary mapping associated with the data extraction process.

16. The system of claim 15, wherein
determining that the first document and the second document corresponds to the particular template includes detecting from each document a template identifier, and
comparing the template identifier to a plurality of template identifiers that correspond to the respective plurality of templates.

17. The system of claim 16, wherein the template identifier is a particular logo that occurs both within the first document and the second document.

18. The system of claim 15, wherein the generated revision information changes a location of the particular field as identified by the particular template.

19. The system of claim 15, wherein the one or more controls includes a control to revise the particular data item.

20. The system of claim 15, wherein the one or more controls includes a control to revise the association between the particular data item and the particular field.

* * * * *